(12) United States Patent
Ouyang et al.

(10) Patent No.: US 11,060,959 B2
(45) Date of Patent: Jul. 13, 2021

(54) SYSTEMS AND METHODS FOR ANALYZING AN ANALYTE EXTRACTED FROM A SAMPLE USING AN ADSORBENT MATERIAL

(71) Applicant: Purdue Research Foundation, West Lafayette, IN (US)

(72) Inventors: Zheng Ouyang, West Lafayette, IN (US); Wenpeng Zhang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 182 days.

(21) Appl. No.: 16/302,379

(22) PCT Filed: Jun. 2, 2017

(86) PCT No.: PCT/US2017/035649
§ 371 (c)(1),
(2) Date: Nov. 16, 2018

(87) PCT Pub. No.: WO2017/210536
PCT Pub. Date: Dec. 7, 2017

(65) Prior Publication Data
US 2019/0277735 A1    Sep. 12, 2019

Related U.S. Application Data

(60) Provisional application No. 62/345,161, filed on Jun. 3, 2016.

(51) Int. Cl.
*G01N 1/40* (2006.01)
*B01D 15/10* (2006.01)
(Continued)

(52) U.S. Cl.
CPC ............. *G01N 1/405* (2013.01); *B01D 11/00* (2013.01); *B01D 11/02* (2013.01); *B01D 15/10* (2013.01);
(Continued)

(58) Field of Classification Search
CPC ........ B01D 11/00; B01D 11/02; B01D 15/10; G01N 1/40; G01N 1/405;
(Continued)

(56) References Cited

U.S. PATENT DOCUMENTS 8,304,718 B2    11/2012  Ouyang et al.
8,410,431 B2    4/2013   Ouyang et al.
(Continued)

FOREIGN PATENT DOCUMENTS

WO   2009/102766 A1    8/2009
WO   2009144560 A1    12/2009
WO   2014/120411    *  8/2014

OTHER PUBLICATIONS

European Search Report for EP 17807554.5, dated Nov. 21, 2019, 7 pages.
(Continued)

*Primary Examiner* — Maureen Wallenhorst
(74) *Attorney, Agent, or Firm* — Brown Rudnick LLP; Adam M. Schoen

(57) ABSTRACT

Systems and methods for analyzing an analyte extracted from a sample using an adsorbent material.

13 Claims, 12 Drawing Sheets

(51) Int. Cl.
  *H01J 49/00* (2006.01)
  *H01J 49/04* (2006.01)
  *B01D 11/00* (2006.01)
  *B01D 11/02* (2006.01)

(52) U.S. Cl.
  CPC ...... *H01J 49/0031* (2013.01); *H01J 49/0436* (2013.01); *G01N 2001/4061* (2013.01); *Y10T 436/255* (2015.01)

(58) Field of Classification Search
  CPC .......... G01N 2001/4061; H01J 49/0031; H01J 49/0436; Y10T 436/24; Y10T 436/25; Y10T 436/25375; Y10T 436/255; Y10T 436/2575
  USPC ................. 436/63, 174, 177, 178, 180, 173; 422/527
  See application file for complete search history.

(56) References Cited

U.S. PATENT DOCUMENTS

| | | | |
|---|---|---|---|
| 8,859,956 | B2 | 10/2014 | Ouyang et al. |
| 10,269,550 | B2* | 4/2019 | Ouyang ............ H01J 49/167 |
| 10,559,456 | B2* | 2/2020 | Ouyang ............ H01J 49/167 |
| 2004/0126890 | A1 | 7/2004 | Gjerde et al. |
| 2004/0241721 | A1 | 12/2004 | Gjerde et al. |
| 2006/0286599 | A1 | 12/2006 | Gierde et al. |
| 2010/0285596 | A1* | 11/2010 | Yu .................... G01N 1/4055 436/71 |
| 2013/0116597 | A1 | 5/2013 | Rudge et al. |
| 2013/0280819 | A1 | 10/2013 | Cooks et al. |
| 2014/0224981 | A1 | 8/2014 | Owen et al. |
| 2014/0264004 | A1 | 9/2014 | Cooks et al. |
| 2015/0318160 | A1* | 11/2015 | Pawliszyn .......... G01N 1/405 250/282 |
| 2016/0201051 | A1 | 7/2016 | Ouyang et al. |

OTHER PUBLICATIONS

Carroll, 1975, Atmospheric Pressure Ionization Mass Spectrometry: Corona Discharge Ion Source for Use in Liquid Chromatograph-Mass Spectrometer-Computer Analytical System, Anal. Chem., 47:2369-2373.
Cody, 2005, Versatile New Ion Source for the Analysis of Materials in Open Air under Ambient Condition, Anal. Chem. 77:2297-2302.
El-Faramawy, 2005, Efficiency of Nano-Electrospray Ionization, J Am Soc Mass Spectrom, 16:1702-1707.
Fenn, 1989, Electrospray Ionization for Mass Spectrometry of Large Biomolecules, Science, 246:64-71.
Fico, 2007, Miniaturization and Geometry Optimization of a Polymer-Based Rectilinear Ion Trap, Anal. Chem., 79:8076-8082.
Gao, 2006, Handheld Rectilinear Ion Trap Mass Spectrometer, Anal. Chem, 78:5994-6002.
Gao, 2008, Design and Characterization of a Multisource Hand-Held Tandem Mass Spectometer, Anal. Chem., 80:7198-7205.
Hendricks, 2014, Autonomous in-situ analysis and real-time chemical detection using a backpack miniature mass spectrometer: concept, instrumentation development and performance, Anal. Chem., 86:2900-2908.
Ho, 2003, Electrospray Ionisation Mass Spectrometry: Principles and Clinical Applications, Clin. Biochem. Rev., 24:3-4.
Hou, 2011, Sampilng Wand for an Ion Trap Mass Spectrometer, Anal. Chem., 83:1857-1861.
International Search Report and Written Opinion dated Sep. 1, 2017 in PCT/US2017/035649, 9 pages.
Karas, 2000, Nano-electrospray ionization mass spectrometry: addressing analytical problems beyond routine, Journal of Analytical Chemistry, 366(6-7):669-676.
Kogelschatz, 2003, Dielectric-barrier Discharges: Their History, Discharge Physics, and Industrial Applications, Plasma Chemistry and Plasma Processing, 23:1-46.
Laiko, 2000, Atmospheric Pressure Matrix-Assisted Laser Desoprtion/Ionization Mass Spectrometry, Analytical Chemistry, 72:652-657.
Li, 2014, Mini 12, Miniature Mass Spectrometer for Clinical and Other Applications—Introduction and Characterization, Anal. Chem., 86:2909-2916.
Mulligan, 2006, Desorption electrospray ionization with a portable mass spectrometer: in situ analysis of ambient surfaces, Chem. Commun. 1709-1711.
Oliveira, 2010, Internal Standard Versus External Standard Calibration: An Uncetainty Case Study of a Liquid Chromatography Analysis, Quim. Nova, 33(4):984-987.
Ouyang, 2009, Handheld Miniature Ion Trap Mass Spectrometers, Anal. Chem., 81:2421-2425.
Ouyang, 2009, Miniature Mass Spectrometers, Ann. Rev. Anal. Chem., 2:187-214.
Pan, 2004, Nanoelectrospray Ionization of Protein Mixtures: Solution pH and Protein pI, Anal. Chem, 76:1165-1174.
Sanders, 2009, Hand-held Mass Spectrometer for Environmentally Relevant Analytes Using a Variety of Sampling and Ionization Methods, Euro. J. Mass Spectrom,16:11-20.
Shiea, 2005, Electrospray-assisted laser desorption/ionization mass spectrometry for direct ambient analysis of solids, J. Rapid Comm in Mass Spectrometry, 19:3701-3704.
Shirey and Mindrup, 1999, SPME-Adsorption versus Absorption: Which Fiber is Best for Your Application?, Sigma-Aldrich Co.
Sokol, 2011, Miniature mass spectrometer equipped with electrospray and desorption electrospray ionization for direct analysis of organics from solids and solutions, Int. J. Mass Spectrom., 306:187-195.
Takats, 2004, Mass spectrometry sampling under ambient conditions with desorption electrospray ionization, Science, 306:471-473.
Tanaka, 1988, Protein and Plymer Analyses up to m/z 100 000 by Laser Ionization Time-of-Flight Mass Spectrometry, Rapid Commun. Mass Spectrom, 2:151-153.
Xu, 2010, Miniaturization of Mass Spectrometry Analysis Systems, JALA, 15:433-439.
Yamashita, 1984, Electrospray Ion Source. Another Variation on the Free-Jet Theme, J. Phys. Chem., 88:4451-4459.

* cited by examiner

SYSTEMS AND METHODS FOR ANALYZING AN ANALYTE EXTRACTED FROM A SAMPLE USING AN ADSORBENT MATERIAL

RELATED APPLICATION

The present application is a 35 U.S.C. § 371 national phase application of PCT/US17/35649, filed Jun. 2, 2017, which claims the benefit of and priority to U.S. provisional application Ser. No. 62/345,161, filed Jun. 3, 2016, the content of each of which is incorporated by reference herein in its entirety.

FIELD OF THE INVENTION

The invention generally relates to systems and methods for analyzing an analyte extracted from a sample using an adsorbent material.

BACKGROUND

Mass spectrometry (MS) is a powerful tool for the analysis of complex mixtures, which provides specific molecular information based on the molecular weights and chemical structures of the target compounds. Traditionally, complex biomedical samples are usually separated using chromatographic techniques, such as high-performance liquid chromatography, gas chromatography and electrophoresis, prior to the MS analysis to minimize the matrix effects as well as to pre-concentrate the analytes. With the development of ambient ionization methods, direct MS analysis can now be performed for rapid and direct analysis of complex biomedical samples without the separation procedures. Meanwhile, simple protocols with low sample consumption and shortened time are still desirable for qualitative and quantitative analysis.

SUMMARY

The invention provides a new approach for liquid-solid phase-liquid extractions and also provides systems and methods that allow for sample preparation and pre-treatment to be combined with the ionization process. Particularly, the invention allows for a liquid-solid phase-liquid extraction to be conducted in a capillary of very small diameter (e.g., capillary of inner diameter as small as 500 µm). The liquid in the capillary may be moved back and forth, which allows for control of the extraction process, i.e., the extraction can be turned on and off. The motion causes interaction of the sample with the solid phase material, leading to extraction of one or more target analytes from the sample onto the solid material. An extraction solvent is then used to elute the target analyte from the solid phase material. The added benefits for using the thin capillary are that small amounts of samples can be handled for quantitative analysis.

Additionally, it is possible for the extraction capillary to serve as an ionization probe. In that manner, the invention provides systems and methods that allow a target analyte in a sample to be extracted and analyzed by mass spectrometry without conducting separate sample preparation and pre-treatment protocols. Rather, systems and methods of the invention are configured so that sample preparation and pre-concentration are conducted within the ionization probe. The purified analyte can then be directly ionized (although not required) and injected into a mass spectrometer from the ionization probe in which the sample preparation and pre-treatment occurred.

Aspects of the invention are accomplished using a solid-phase extraction material. The solvent and the sample are placed within an ionization probe of the invention. One or more target analytes from the sample are extracted onto the solid-phase extraction material, while non-target components of the sample (e.g., salts in urine) remain in the sample. The extraction solvent is then used to elute the target analytes from the solid-phase extraction material. An electrode is then operably coupled to the extraction solvent within the body of the ionization probe and the target analyte is ionized and injected into the mass spectrometer. In that manner, sample preparation and pre-treatment are combined with the ionization process, and when voltage is applied to the solvent, the target analyte does not need to compete with the non-target components of the sample for charges. Accordingly, systems and methods of the invention effectively suppress matrix effects, and allow for better ionization of target analytes from samples, particularly biological samples, such as blood, saliva, urine, or spinal cord fluid. Systems and methods of the invention also have the added benefit of pre-concentrating target analytes from a sample into the extraction solvent, thereby avoiding expensive chromatography equipment and time consuming separation protocols, and enabling point-of-care sample analysis systems and methods.

In certain embodiments, the invention provides methods for extracting an analyte from a sample that involve introducing a sample into a capillary, interacting the sample within the capillary with an adsorbent material within the capillary such that at least one analyte is extracted from the sample and binds to the adsorbent material, introducing an extraction solvent into the capillary, and interacting the extraction solvent with the adsorbent material in order to elute the at least one analyte from the adsorbent material. In certain embodiments, the capillary is kept discrete (i.e. separate or disconnected from) from a flow of solvent. Instead, the sample and the extraction solvent are aliquoted into the capillary for conducting methods of the invention. Depending on the approach used, the extraction solvent may be immiscible with the sample or miscible with the sample.

There are numerous different approaches for having the adsorbent material within the capillary. In one approach, the adsorbent material coats a portion of walls of the capillary. In such an approach, the capillary is moved a first time to cause the sample to interact with the adsorbent material and then moved a second time to cause the extraction solvent to interact with the adsorbent material after the sample has interacted with the adsorbent material. In certain embodiments, the sample and the extraction solvent are both within the capillary and are separated from each other by an air gap. In other embodiments, the sample and solvent contact each other without mixing with each other, i.e., the sample and solvent are immiscible with each other.

In another approach, a probe includes the adsorbent material and the probe is configured to fit within the capillary. The probe is then inserted into the sample within the capillary in a manner that the adsorbent material enters the sample. The probe is then moved from the sample into the extraction solvent that is already within the capillary in a manner that the adsorbent material enters the extraction solvent. Alternatively, the sample is removed from the capillary and the extraction solvent is introduced to the capillary in a manner that the adsorbent material interacts with the extraction solvent.

Methods of the invention may further involve analyzing the extracted analyte. In certain embodiments, analyzing involves applying a voltage to the extraction solvent comprising the at least one analyte in the capillary so that the analyte is expelled from the capillary, thereby generating ions of the analyte, and analyzing the ions (online approach). In other embodiments, analyzing involves removing the solvent comprising the at least one analyte from the capillary; and conducting an assay that analyzes the analyte (offline approach).

Methods of the invention may also involve conducting a reaction with the target analyte in the sample. In certain embodiments, the adsorbent material includes one or more molecules that react with the at least one target analyte and a reaction is conducted between the one or more molecules and the at least one target analyte to produce a reaction product, which can then be analyzed by either of the approaches described above (e.g., online approach or offline approach). In other embodiments, the extraction solvent includes one or more molecules that react with the at least one target analyte and a reaction is conducted between the one or more molecules and the at least one target analyte to produce a reaction product, which can then be analyzed by either of the approaches described above (e.g., online approach or offline approach).

In certain embodiments, the adsorbent material includes an internal standard. The internal standard may be eluted from the adsorbent material by the extraction solvent. The method may further involve analyzing the internal standard and the one or more target analytes using either of the approaches described above (e.g., online approach or offline approach). In such embodiments, the analyzing may be performed in a quantitative manner.

BRIEF DESCRIPTION OF THE DRAWINGS

FIG. 2 panel B shows a scanning electron micrograph of the poly(EGDMA-AA) layer.

FIG. 8 panel B is a graph showing ratios of intensity of fatty acid 18:2 extracted from bovine blood with that of two internal standards introduced by the polymer coating.

FIG. 10 panel B shows comparison of Rel. % of Δ11 C=C location isomers from fatty acid C18:1 between normal and cancerous mouse breast tissues.

DETAILED DESCRIPTION

Figure 1:
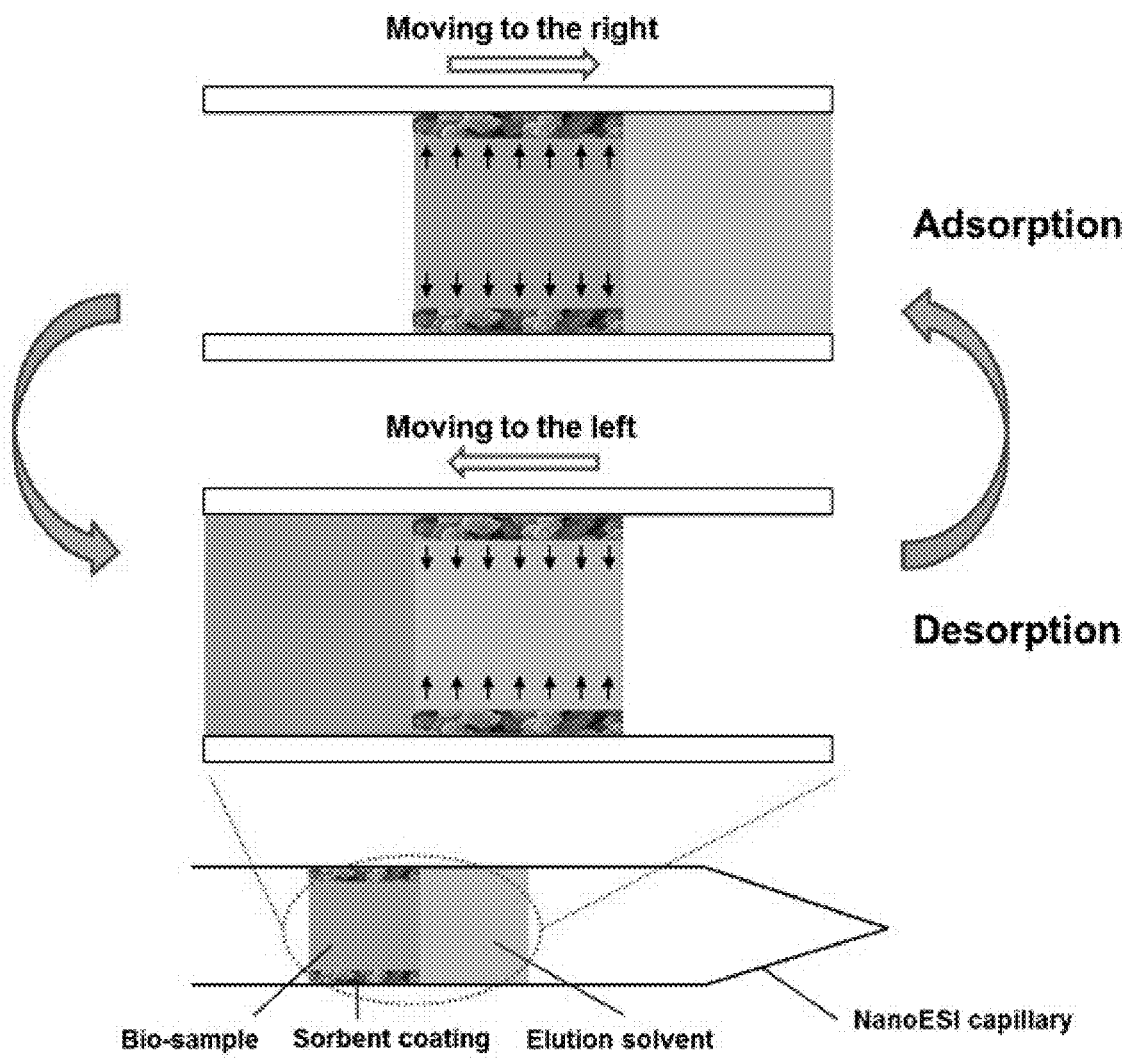
FIG. 1 shows a schematic of coated-capillary based microextraction.

The invention generally relates to systems and methods for analyzing an analyte extracted from a sample using an adsorbent material. Aspects of the invention describe a capillary sample pretreatment method that integrates capillary modification, continuous in-capillary microextraction, introduction of internal standard, spray generation as well as optional online chemical reaction in a pulled glass capillary, and is useful for fast, qualitative and quantitative analysis of complex mixtures. In certain embodiments, the inner surface of the capillary is modified with a layer of adsorbent(s) material. Analyte extraction is achieved by molecular exchange among three phases: sample solution, organic solvent for elution and coated adsorbent. Analytes are first adsorbed onto the coated adsorbent when the plug of sample solution moves in the adsorbent area. The adsorbed analytes are then eluted into the plug of organic solvent. The process is repeated many times to enrich the analytes into the organic solvent (FIG. 1). The capillary can be used online or offline to couple with nanoESI-MS. At each extraction cycle, the amount of analyte ($n_i$) that can be extracted into the organic solvent can be estimated by equation (1) found below, where $C_0$ is the analyte concentration in sample solution before extraction; $V_s$ and $V_c$ are the volume of the sample and the coating, respectively, K is the distribution coefficient of the analyte between the coating and sample matrix, and $a_i$ is the elution rate of the organic phase which elutes the analytes from the coating.

$$n_i = a_i \frac{KV_sV_c}{V_s + KV_c} C_i \qquad (1)$$

Other aspects of extraction and analysis of an extracted sample are described for example in Ouyang et al. (U.S. patent application publication number 2016/0201051), the content of which is incorporated by reference herein in its entirety.

Figure 2:
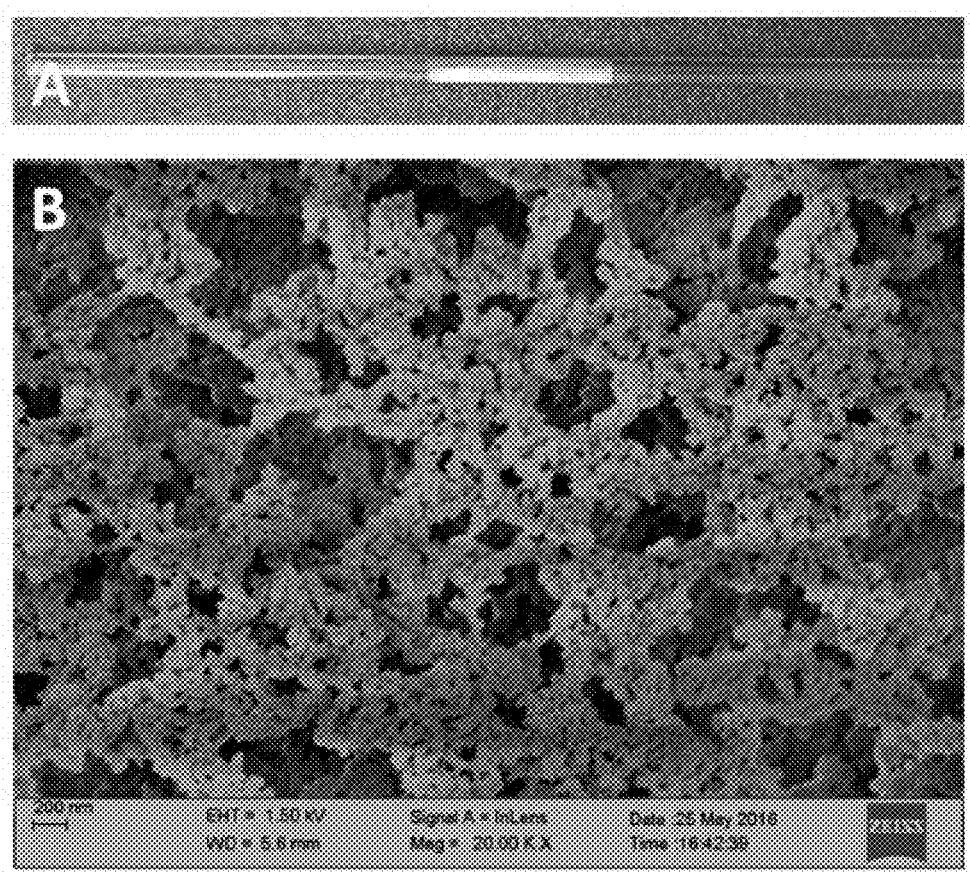
FIG. 2 panel A shows a photograph of a poly(EGDMA-co-AA) coated capillary.
Figure 3:
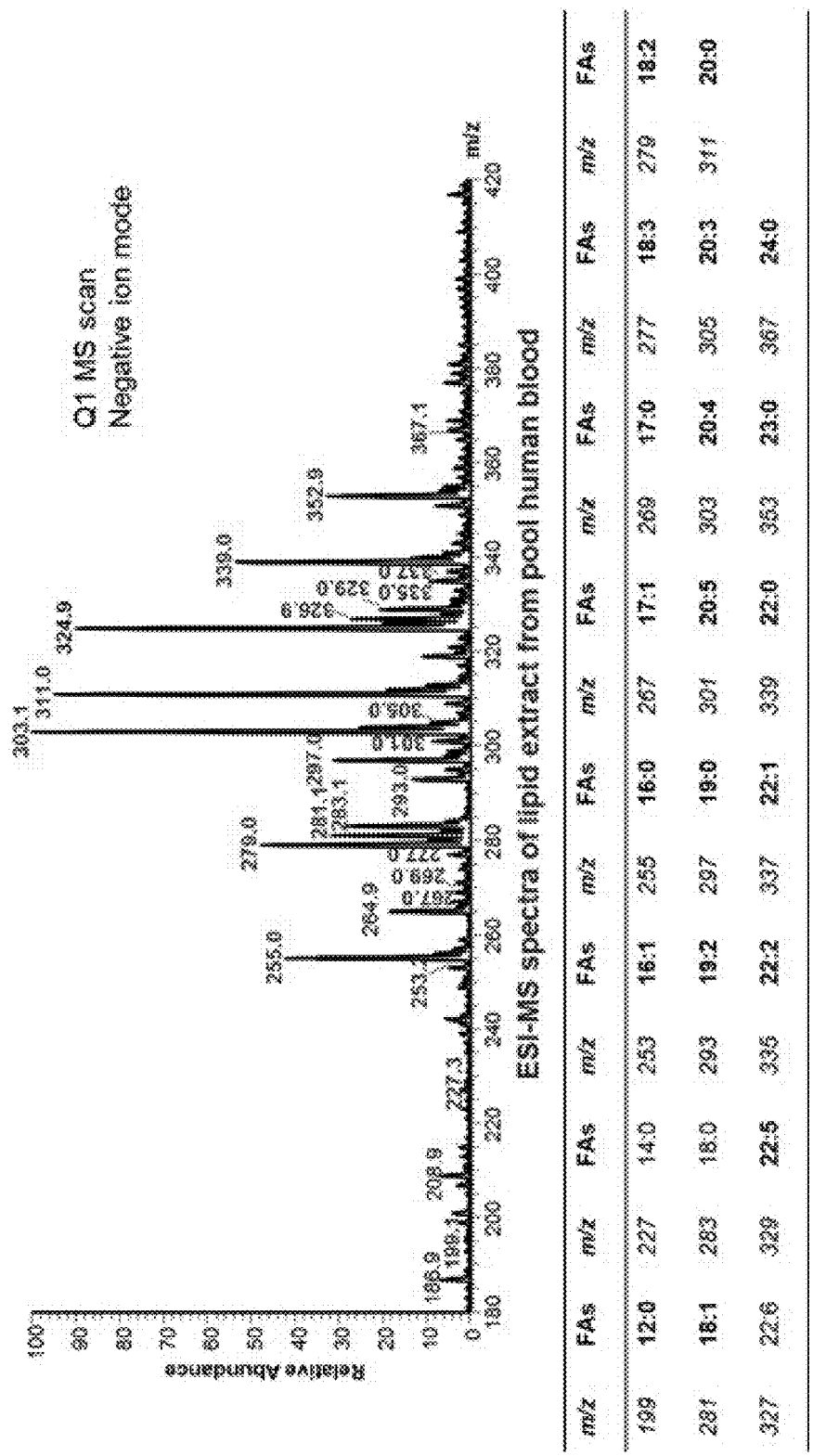
FIG. 3 shows mass spectrum of fatty acids in the healthy human blood sample with extraction by the polymer-coated capillary.
Figure 4:
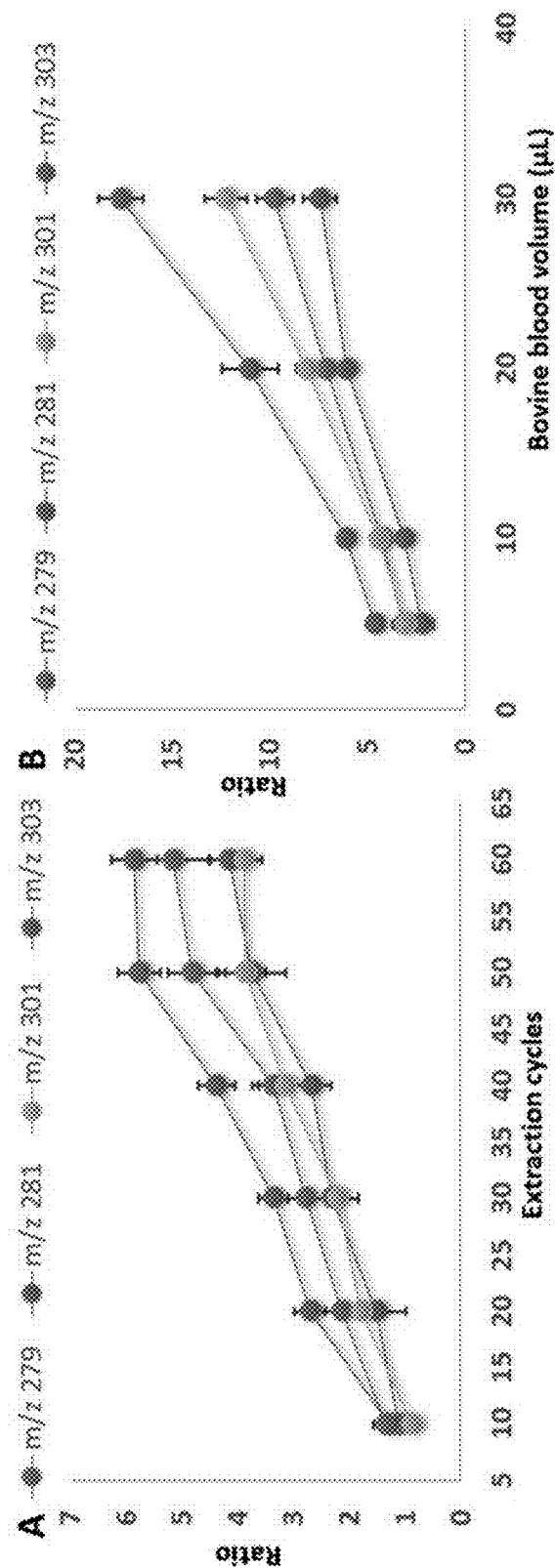
FIGS. 4A-B shows the effect of extraction cycles and sample volumes on the extraction efficiency of fatty acids in bovine blood samples. Ethyl acetate of 5 µL was used as the extraction solvent, with linoleic acid-d11 as the internal standard.

The performance of coated capillary-based microextraction-nanoESI was first investigated by direct profile of free fatty acids in blood samples. A poly(ethylene glycol dimethacrylate-co-acrylamide) (poly(EGDMA-co-AA) thin layer was synthesized in the inner surface of the glass capillary. The thin layer of the polymer was polyporous (FIG. 2 panels A-B), with a number of large pores, mesopores, and micropores, which facilitates contact of the bio-samples and the surface of the polymer, as well as enhancing extraction efficiency. Ethyl acetate was used as the organic solvent due to its good eluting capability to fatty acids from poly(poly (EGDMA-co-AA) layer. The extraction was completed in 1-2 min, ethyl acetate with extracts was then injected for nanoESI-MS analysis. By using raw human blood sample as low as 5 µL, a number of peaks for free fatty acids can be found (FIG. 3). At least 24 fatty acids were identified according to the reported data. Rat blood and bovine blood have also been analyzed. Although only small amount of analytes can be adsorbed onto the coating in each extraction cycle, more cycles can be applied very easily and simply to increase the extraction efficiency. By using bovine blood spiked with linoleic acid-d11 as internal standard, the effect of extraction cycles was studied (FIG. 4A). About 50 times were required to achieve extraction equilibrium, however, the total time for the extraction could be as less as 1 min. Typically, the ratio of organic phase and blood sample is 1:1 (5 µL and 5 µL). However, the volume of the blood sample can be increased to be several times larger than that of the organic phase. The extracted fatty acids steadily increased along with the increase of blood volume (FIG. 4B).

Figure 5:
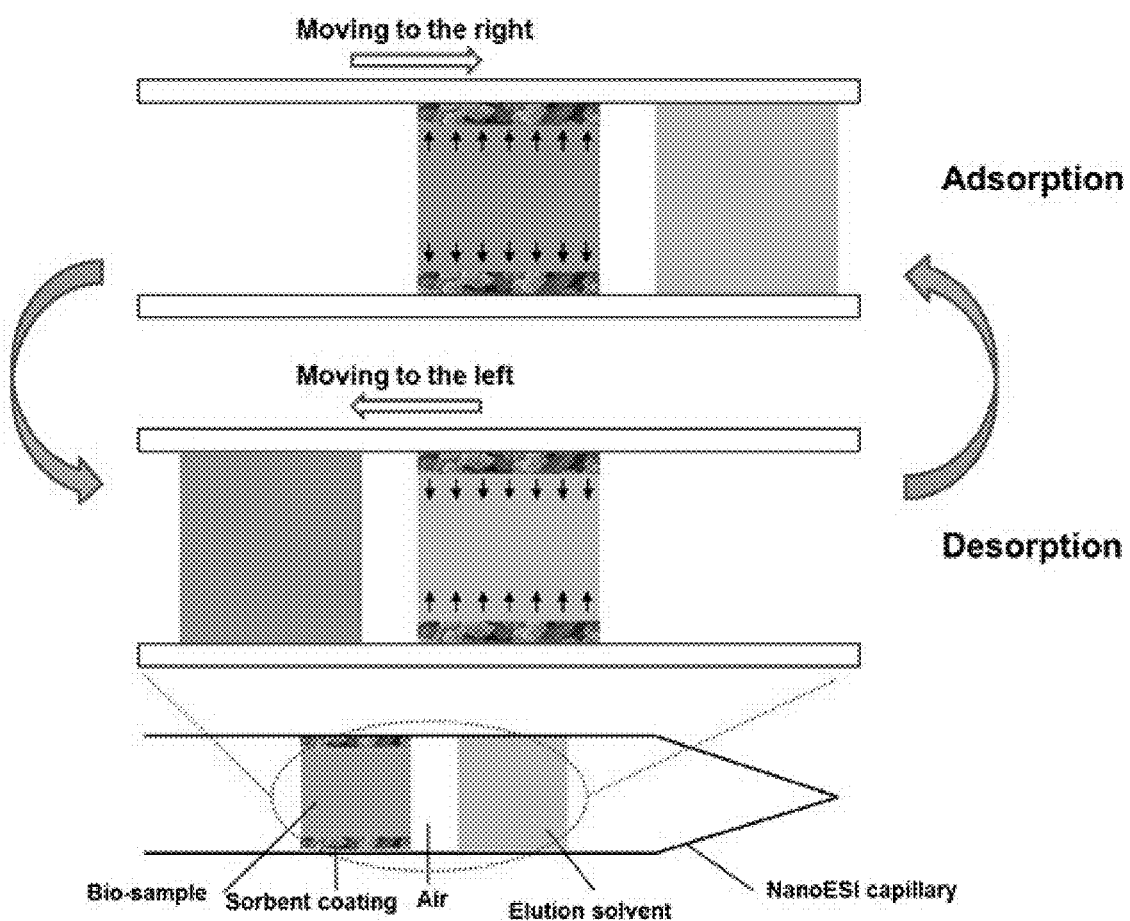
FIG. 5 is a schematic of a coated-polymer based microextraction with a plug of air between bio-sample and elution solvent.

The plugs of blood and organic solvent connected with each other for the purpose of simplifying the extraction operation. However, the exchange of analytes between the blood and organic phase may limit the eventual extraction efficiency of the method, since analytes which have been eluted into the organic phase can diffuse back to the blood samples. A plug of air about 5 mm can be left between the bio-sample and extraction solvent (FIG. 5). In such embodiments, the bio-sample and extraction solvent don't touch each other during the extraction process, which can limit the analytes exchange between the bio-sample and extraction solvent, the extraction efficiency would increase as a result.

Figure 6:
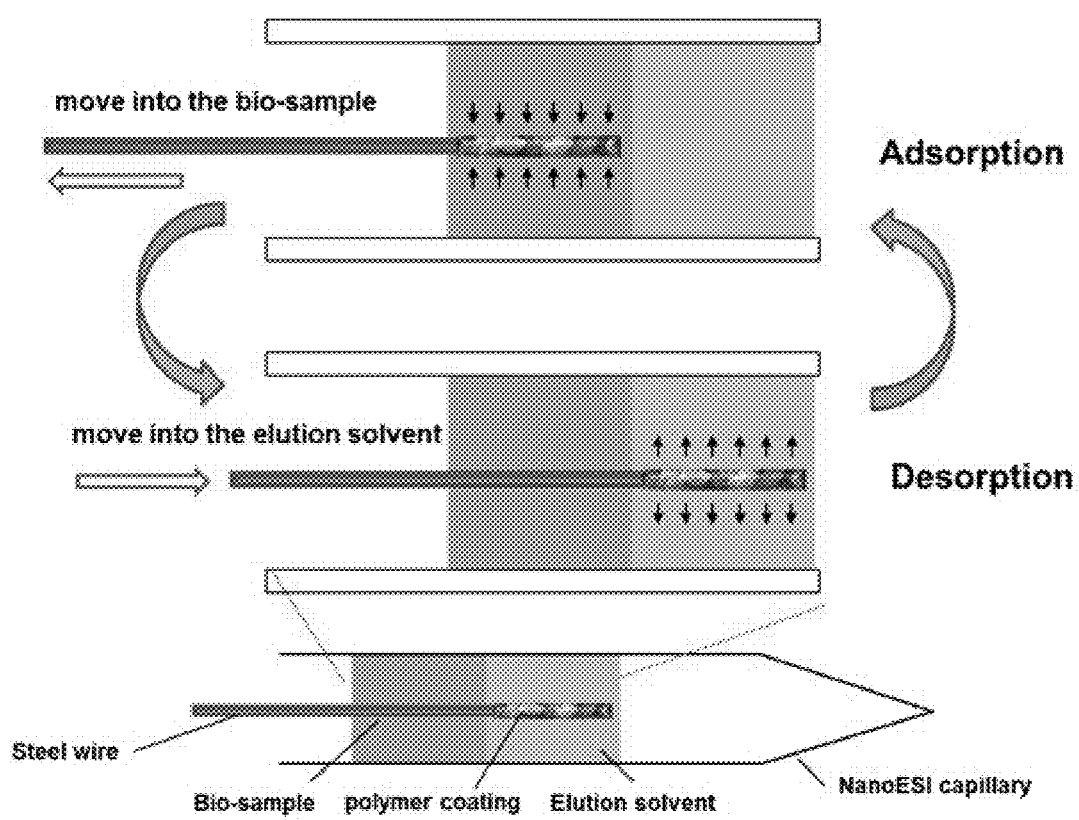
FIG. 6 is a schematic of a coated-metal wire for in-capillary extraction.

The adsorbent can also be coated onto a thin metal wire, such as steel wire. The bio-sample and elution solvent are also injected into the capillary one by one. The adsorption takes place when the coated steel was inserted into the bio-sample solution and the desorption takes place immediately when the coated the steel inserted into the elution solvent (FIG. 6). Take extraction of lipid in the blood as an example. Ethyl acetate of 5 µL and blood of 5 µL are injected into a glass capillary. The polymer coated steel wire is first inserted into the blood, adsorbing some lipids onto the coating. When the coated wire continues to move into ethyl acetate. Lipids that adsorbed onto the coating would be desorbed into ethyl acetate. Lipids would be enriched into ethyl acetate by repeating to move the coated steel wire between blood and ethyl acetate.

Figure 7:
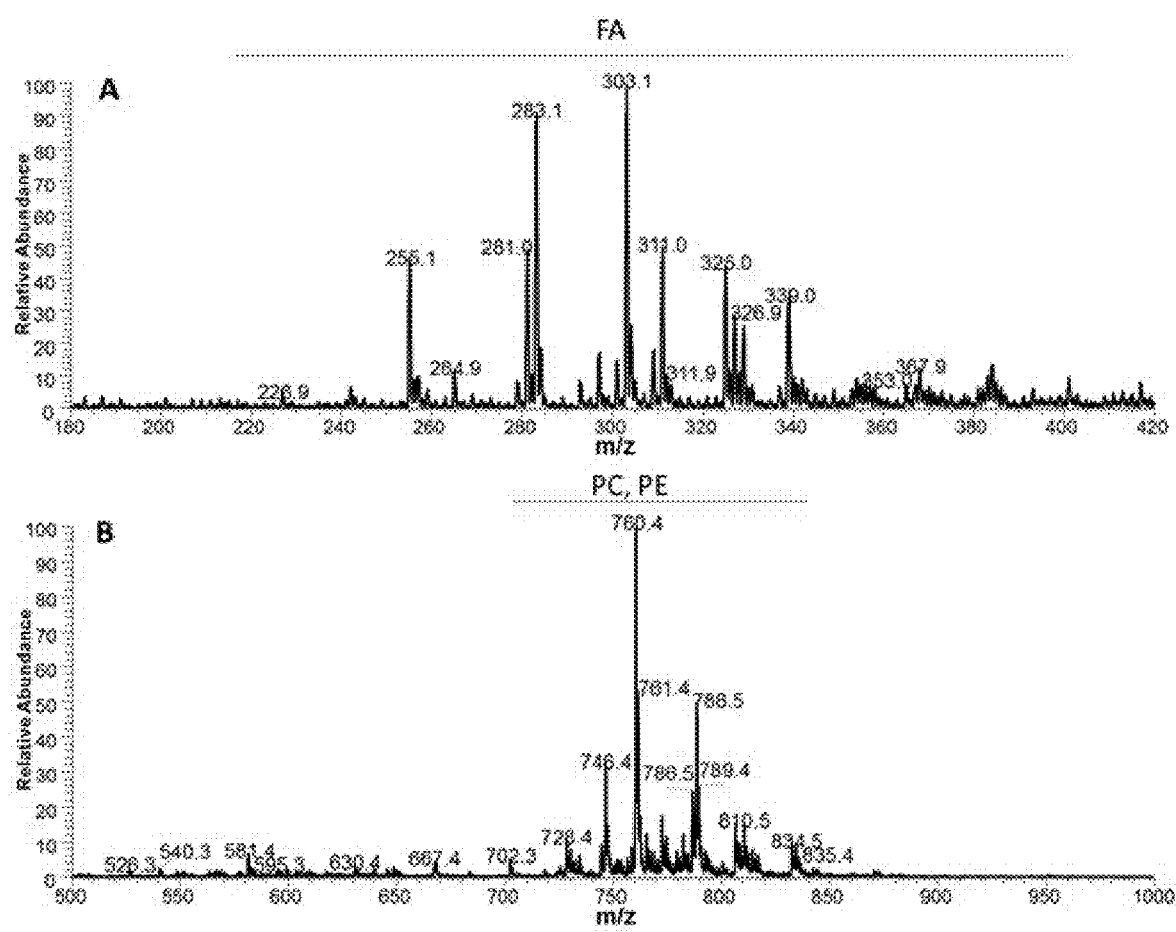
FIG. 7 panels A-B shows spectra of rat spinal cord with extraction by polymer-coated capillary. Panel A shows full scan in negative mode and Panel B shows full scan in positive mode.

The coated capillary is applicable to liquid samples, including blood samples, as well as tissue homogenized solution samples. An investigation of extraction of rat spinal cord by the polymer-coated capillary was performed. Healthy rat spinal cord was homogenized in a PBS solution firstly; the concentration of the rat spinal cord could be as low as 0.05 mg/mL. Ethyl acetate of 5 µL and rat spinal cord homogenized solution were then pushed into the poly (EGDMA-co-AA) capillary to perform in-capillary extraction. Fatty acids in the rat spinal cord homogenized solution can be well extracted and detected by MS (FIG. 7 panels A-B). Some other kinds of lipids were also extracted and detected in the rat spinal cord sample, such as phosphocholines (PCs) and phosphoethanolamines (PEs). Without being limited by any particular theory or mechanism of action, it is believed that small pieces of tissue could be adsorbed by the polyporous polymer coating, PCs and PEs in these tissues were then eluted and enriched by ethyl acetate.

Figure 8:
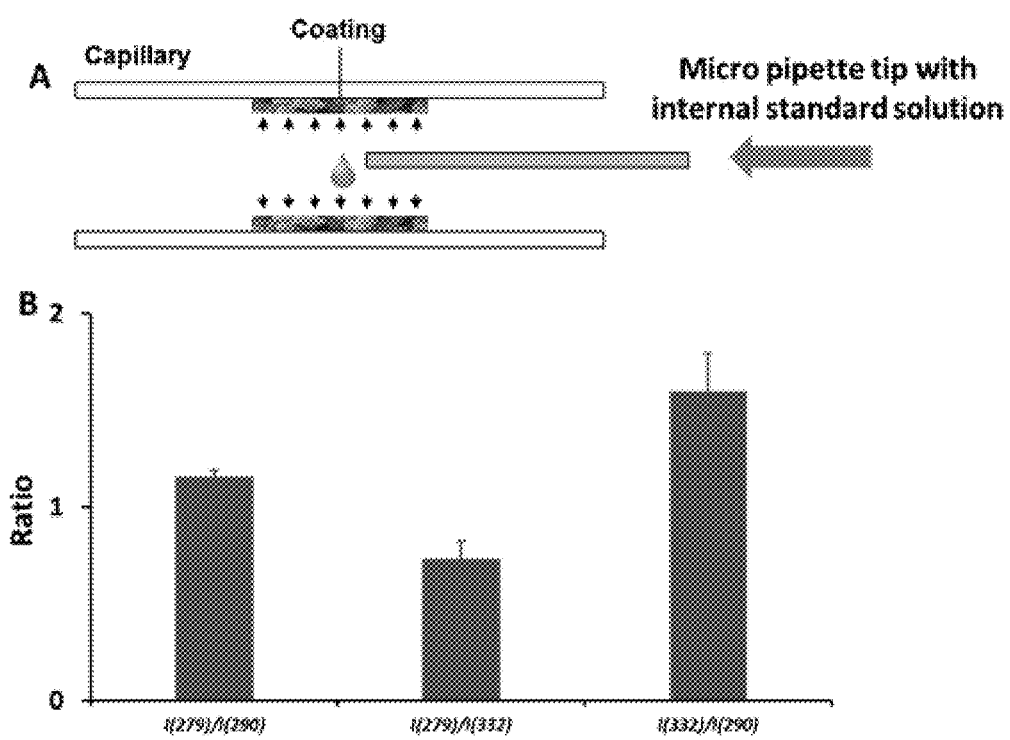
FIG. 8 Panel A is a schematic of introduction of internal standards into a coated-capillary based microextraction.

The coating inside the capillary can be used as a substrate for introduction of the internal standards for extraction or analysis. Two isotopically labeled fatty acids, linoleic acid-d11 and docosahexaenoic acid-d5 were used as the internal standards for extraction and analysis of fatty acids in the blood samples. Linoleic acid-d11 and docosahexaenoic acid-d5 were dissolved in ethyl acetate firstly; 1 µL of the solution was then injected onto the polymer layer carefully. The polyporous polymer layer can absorb the solution, after drying, internal standards would retain on the polymer, realizing the immobilization of the internal standards. For a typical extraction, when ethyl acetate and blood sample was introduced into the capillary, the internal standards would be eluted from the polymer layer and dissolved into one or both of the plugs of liquid, realizing introduction of the internal standards. The reproducibility of the method was good with relative standard deviations less than 12.8% for five repeated extractions (FIG. 8 panels A-B).

Figure 9A:
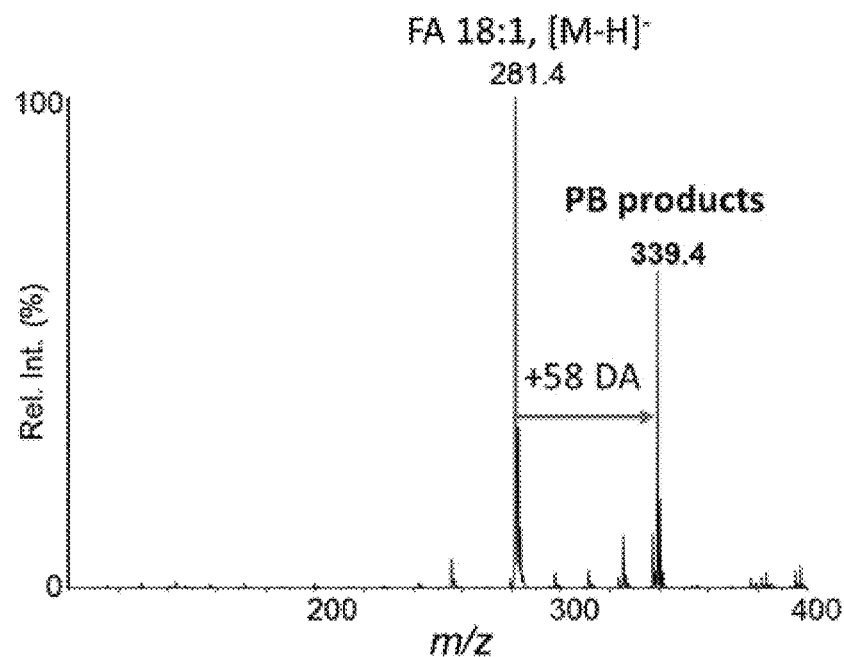
FIG. 9A shows a PB reaction MS spectrum of a mixture of fatty acid 18:1(9Z) (5.0 µM) and (11Z) (5.0 µM) isomer mixtures in negative ion mode.
Figure 9B:
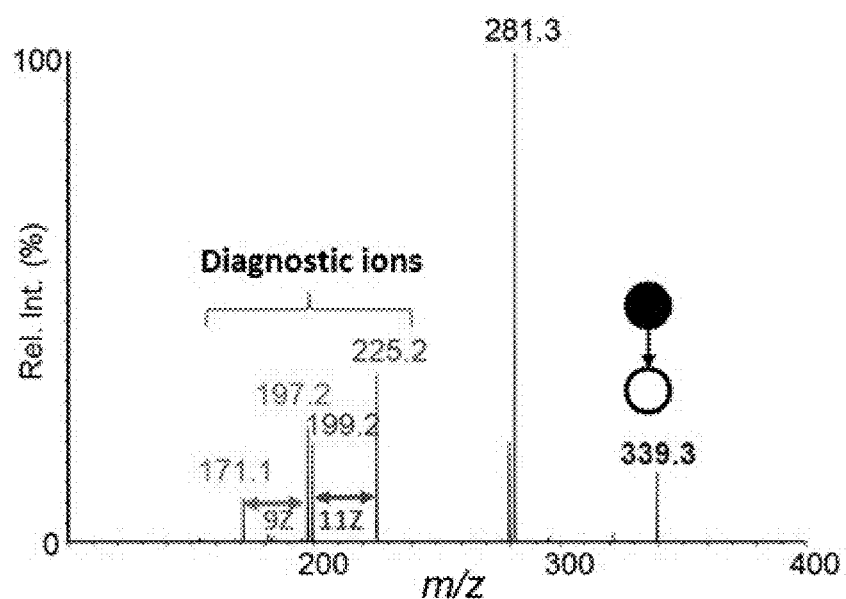
FIG. 9B shows a PB-MS/MS spectrum of m/z 339 formed in FIG. 9A. Diagnostic ions of the two fatty acid 18:1 isomers are shown.
Figure 9C:
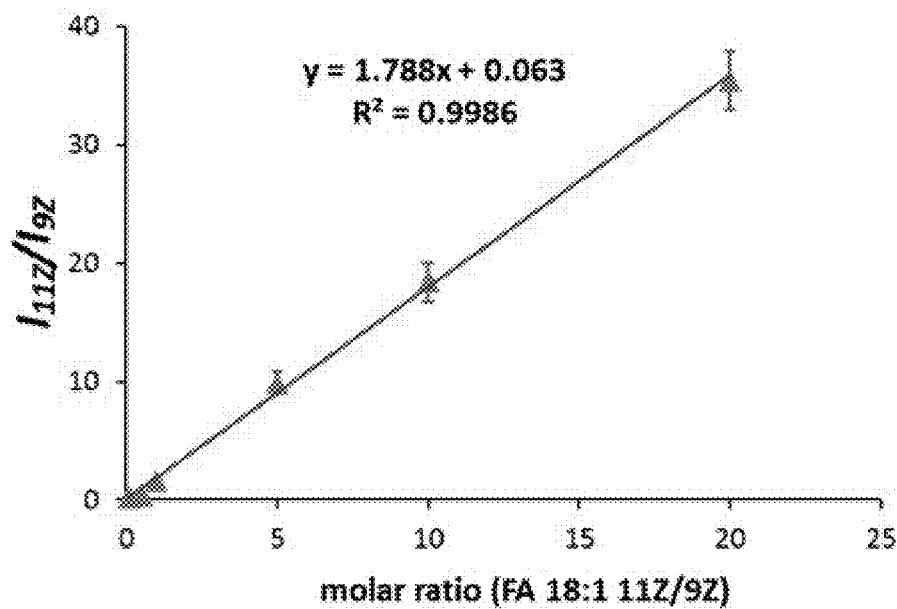
FIG. 9C is a graph showing a linear relationship established between diagnostic ion ratio (I11Z/I9Z) and molar ratio (c11Z/c9Z) of the two fatty acid 18:1 C=C location isomers.
Figure 9D:
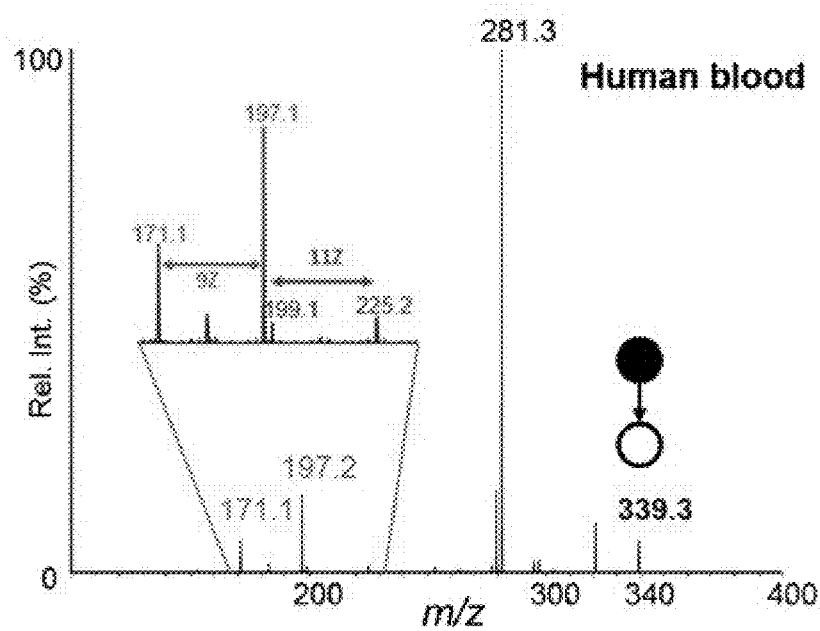
FIG. 9D shows a PB-MS/MS spectrum of fatty acid 18:1 isomers from human blood sample with extraction by polymer-coated capillary.
Figure 10:
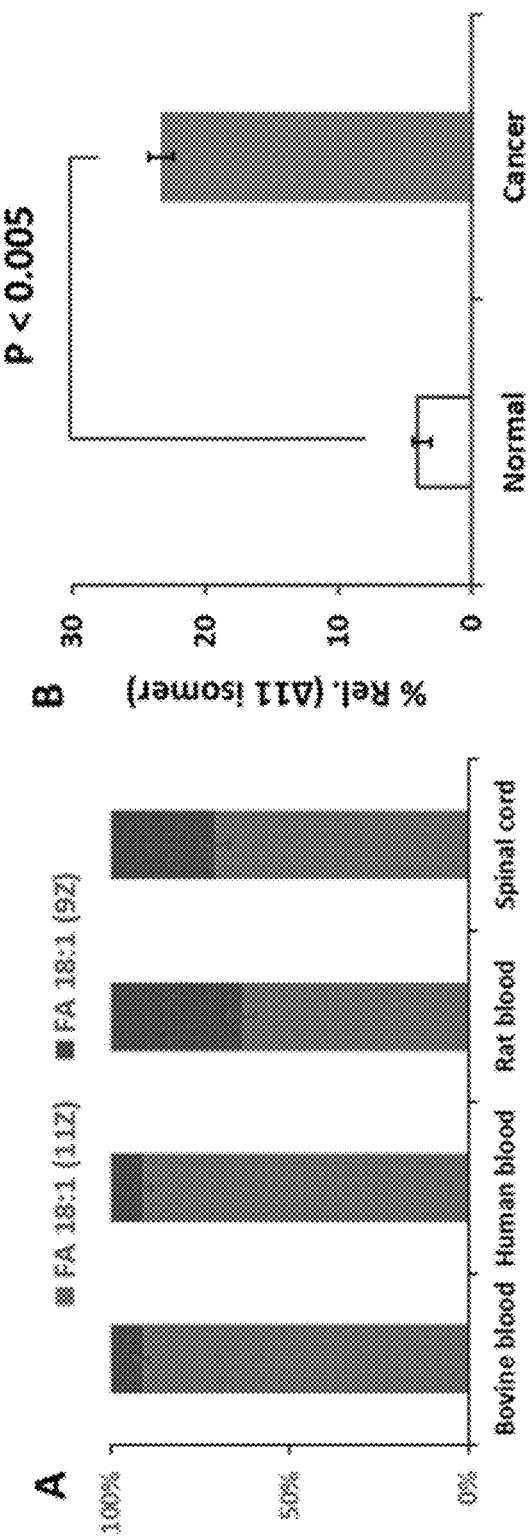
FIG. 10 panel A shows fatty acid 18:1 isomer composition of in bovine, human and rat blood and spinal cord homogenized solution.

Another application of the coated-capillary based microextraction is fast identification and quantitation of lipid C=C location isomers in raw bio-samples. The extraction was coupled with an online photochemical reaction, Paternó-Büchi (PB) reaction, in which acetone was used as the PB reagent for 250-nm UV irradiation. The ions of PB reaction products have a mass shift of +58 Da due to acetone addition to intact unsaturated lipids. CID of products caused cleavage at the original C=C locations and gave C=C diagnostic ions, which were used for C=C location determination (FIGS. 9A-C). Determination of FA 18:1 C=C isomers in raw blood and tissue samples were explored. Ethyl acetate and blood of 5 µL were introduced into the polyporous poly(EGDMA-co-AA)-coated capillary for extraction. After extraction, ethyl acetate was evaporated through sparging by nitrogen, which will just take half of minute. Residual fraction of extract was resolved by acetonitrile/water (1:1, v/v) and loaded into pulled capillary tip for photochemical reaction and nanoESI-MS analysis. In a total time of 2-3 min, ratio of FA 18:1 C=C isomers, namely, $\Delta 9$ and $\Delta 11$ isomers in a raw blood or tissue sample can be obtained (FIG. 9D). This is much faster than can be obtained by conventional extraction methods, which usually takes more than 1 h. Four samples have been investigated, including human blood, bovine blood, rat blood and rat spinal cord homogenized solution. The method was also tried to determine the difference of FA 18:1 C=C isomers ratio between healthy and disease state bio-samples (FIG. 10 panels A-B). $\Delta 11$ isomers were found to significantly increase (***$P<0.0005$) in the mouse cancerous beast tissues for fatty acid 18:1 (23.4±0.9% vs. 4.1±0.4%, cancer vs. normal).

Other materials may also be modified in the capillary. For instance, by modification of hydrophilic polymer layer, the in-capillary microextraction method could be used for extraction of polar lipids, metabolites or drugs in raw blood or tissue samples. By modification of materials contain special components such as titanium dioxide or boric acid groups, it may be used for extraction of phosphate compounds or saccharides.

The coating in the capillary may be a platform of biological/chemical reaction. For example, enzymes may be immobilized onto the coating to induce enzymatic reactions when bio-sample or any other kinds of sample solutions are introduced into the capillary. The products could be extracted by the plug of extraction solvent rapidly for further reaction or analysis. Some reactive compounds are modified on the coating to induce chemical reactions among the coating. The products are extracted by the plug of extraction solvent rapidly for further reaction or analysis. Some reactions may be interrupted by the complex biological matrices; the coating could be an intermediate zone to solve the problem. For instance, by putting a plug of air between sample and extraction solvent plugs, analytes in the sample adsorb onto the coating when the sample solution flows through the coating. When the extraction solvent flows through the coating, it will get the analytes for further reaction without contacting the sample solution.

Numerous methods exist for analyzing the ions. In certain embodiments, analyzing involves introducing the ions to a mass analyzer of a mass spectrometer or a miniature mass spectrometer. Any type of mass spectrometer known in the art can be used with proves of the invention. For example, the mass spectrometer can be a standard bench-top mass spectrometer. In other embodiments, the mass spectrometer is a miniature mass spectrometer. An exemplary miniature mass spectrometer is described, for example in Gao et al. (Anal. Chem., 2006, 78, 5994-6002), the content of which is incorporated by reference herein in its entirety. In comparison with the pumping system used for lab-scale instruments with thousands watts of power, miniature mass spectrometers generally have smaller pumping systems, such as a 18 W pumping system with only a 5 L/min (0.3 $m^3$/h) diaphragm pump and a 11 L/s turbo pump for the system described in Gao et al. Other exemplary miniature mass spectrometers are described for example in Gao et al. (Anal. Chem., 2008, 80, 7198-7205), Hou et al. (2011, Anal. Chem., 83, 1857-1861), and Sokol et al. (Int. J. Mass Spectrom., 2011, 306, 187-195), the content of each of which is incorporated herein by reference in its entirety. Miniature mass spectrometers are also described, for example in Xu et al. (JALA, 2010, 15, 433-439); Ouyang et al. (Anal. Chem., 2009, 81, 2421-2425); Ouyang et al. (Ann. Rev. Anal. Chem., 2009, 2, 187-214); Sanders et al. (Euro. J. Mass Spectrom., 2009, 16, 11-20); Gao et al. (Anal. Chem., 2006, 78, 5994-6002); Mulligan et al. (Chem. Comm., 2006, 1709-1711); and Fico et al. (Anal. Chem., 2007, 79, 8076-8082), the content of each of which is incorporated herein by reference in its entirety.

In certain embodiments, the mass spectrometer inlet is located remote from the ionization probe and an ion transfer member is used to transfer over longer distances. Exemplary ion transfer members are described for example in Ouyang et al. (U.S. Pat. No. 8,410,431), the content of which is incorporated by reference herein in its entirety.

In certain embodiments, the ionization probes of the invention operate without pneumatic assistance. That is, with probes of the invention, pneumatic assistance is not required to transport an analyte; rather, a voltage is simply applied to the substrate that is held in front of a mass spectrometer. However, in certain embodiments, nebulizing gas may be used with systems of the invention to assist with desolvation. The nebulizing gas may either be pulsed or provided as a continuous flow. In other embodiments, a gas generating device is operably coupled to the probe such that it can inject a gas into the hollow body to push the sample and solvent to a distal tip of the probe. The gas will typically be an inert gas, such as nitrogen or argon, but can also be air.

In certain embodiments, the ionization probe is kept discrete (i.e., separate or disconnected) from a flow of solvent, such as a continuous flow of solvent. Instead, discrete amounts of solvent and sample are introduced into the hollow body of the probe. The probe is then connected to a voltage source to produce ions of the sample which are subsequently mass analyzed. The sample is transported through the hollow body without the need of a separate solvent flow. As previously mentioned, pneumatic assistance is not required to transport the analyte; rather, a voltage is simply applied to the solvent in the probe that includes the extracted analyte that is held in front of a mass spectrometer.

The invention is not necessarily limited to a capillary and other hollow bodies can be used with methods of the invention. The hollow body can have a distal tip for ejecting a spray of a solvent that is loaded into the probe. An exemplary hollow body is a nano-ESI probe capillary with a distal tip. Exemplary nano-ESI probes are described for example in each of Karas et al. (Fresenius J. Anal. Chem. 2000, 366, 669-76) and El-Faramawy et al. (J. Am. Soc. Mass. Spectrom., 2005, 16, 1702-1707), the content of each of which is incorporated by reference herein in its entirety. Nano-ESI needles are commercially available from Proxeon Biosystems (Odense, Denmark) and New Objective Inc (Woburn, Mass.). In other embodiments, the system may include a sample cartridge containing one or more spray tips and one or more electrodes.

An exemplary hollow body is a glass borosilicate capillary of 0.86 mm inner diameter with a pulled tip. The tip will typically have a diameter from about 2 μm to about 50 μm. Plastic and rubber tubing can also be used for the hollow body. For example, the hollow body can be composed of PEEK tubing (polyether ether ketone polymer tubing) or TEFLON tubing (polytetrafluoroethylene (PTFE) polymer tubing) or TYGON tubing (flexible tubing consisting of a variety of base materials).

An exemplary hollow body is a fused silica capillary of 0.5 mm or 0.25 mm inner diameter, with or without a pulled tip.

Methods of the invention can be used with any type of sample, such as organic or non-organic, biological or non-biological, etc. In certain embodiments, the sample is derived from a biological tissue or is a biological fluid, such as blood, urine, saliva, or spinal cord fluid. The sample may include an analyte of interest to be analyzed. That analyte can be native to the sample or may have been introduced into the sample. Exemplary analytes include therapeutic drugs, drugs of abuse and biomarkers. Using systems and methods of the invention, effective suppression of the matrix effect is achievable for, for example, therapeutic drugs, drugs of abuse and biomarkers. In certain embodiments, systems and methods of the invention can be used for direct analysis of the biofluid samples or liquid samples.

The solvent may be any solvent and ideal solvents work for both extraction and ionization of the sample. Typically, the chosen solvent depends on the sample to be analyzed and/or the analyte of interest believed to be in the sample. A factor to be considered is the polarity of the solvent. If the solvent is immiscible with the sample, ideally the solvent has a different polarity then the sample and/or the analyte of interest believed to be in the sample. For example, an aqueous sample typically has a high polarity, and therefore a good choice of solvent would be an organic solvent with a low polarity (e.g., methanol or ethyl acetate or mixtures that include those solvents e.g., water/methanol mixtures or water/ethyl acetate mixtures). An oil sample typically has a low polarity, and therefore a good choice of solvent would be a solvent with a higher polarity, such as a water/methanol mixture. The skilled artisan will be able to determine the proper solvent to use based on the sample to be analyzed.

Another consideration of the solvent is that in addition to being good for an extraction of an analyte from a sample, it can also be used to ionize the sample. That is, the solvent can be compatible for both the extraction and the ionization of the extracted analyte. Methanol and ethyl acetate work well for extraction of analytes as well as for ionization of analytes, while chloroform works well for extraction but not for ionization of analytes. Typically, a solvent that is compatible with electrospray ionization can possibly be used with systems and methods of the invention, so long that solvent is also immiscible with the sample and is able to extract an analyte from the sample. The skilled artisan having experience in mass spectrometry will know particular solvents that are compatible with electrospray ionization.

One of skill in the art will recognize that the order in which the sample and the solvent are introduced to the hollow body does not matter. In certain embodiments, the solvent is introduced first and the sample is introduced second. In other embodiments, the sample is introduced first and the solvent is introduced second. In certain embodiments, the sample and the solvent are immiscible. In certain embodiments, more than one solvent is used. For example, a second solvent can be introduced that sits between the first solvent and the sample (three phase embodiments). The second solvent can act as a solvent bridge, and is immiscible with the sample and the first solvent, which are typically miscible with each other in such an embodiment.

In certain embodiments, the sample and the solvent are gently moved. That can be conducted manually, by gently tilting the capillary, or through use of a moving mechanism. An exemplary moving mechanism is a pump that applies altering pneumatic forces within the hollow body to push and pull the sample within the body, thereby causing gentle movements. Other mechanisms can be standard sample agitators or mixing machines known to those of skill in the art. In certain embodiments, magnetic beads are added into the sample and extraction solvent and an alternating magnetic field is applied to induce the movements of the magnetic beads inside the sample and solvent, thereby to facilitate the turbulents inside the hollow body for transporting the analytes to interact with the adsorbent material within the hollow body.

In certain embodiments, the target to be analyzed is a target that is not efficiently ionized, for example, by spray ionization. In such embodiments, it is beneficial to derivatize the target molecule by introduce an agent that is able to impart a charged group to the target, thereby making it more amenable to ionization. For example, steroids are difficult to ionize by spray ionization. Introducing an agent to the sample, such as hydroxylamine, imparts a charged group to the steroid, making it amenable to spray ionization.

In certain embodiments, the hollow body is configured such that there is no electrode disposed on a surface of the body. Instead, an electrode is at least partially disposed within the hollow body. In an exemplary embodiment, the electrode can be a metal wire that extends into the hollow body. Any metal typically used for electrodes can be used for the metal electrode. That metal wire is connected to a voltage source, such as a high voltage source. The metal wire can extend any length into the hollow body. In certain embodiments, the metal wire can extend to a distal end of the hollow body. Alternatively, the metal wire can be much shorter, extending not as far into the body. The amount of solvent added to the hollow body will determine the length of the metal wire, as the wire should extend far enough into the body to interact with the solvent that has been added to the body.

The metal wire may be coaxially disposed within the hollow body, although this is not required. Typically, the metal wire does not touch as the walls of the hollow body. The metal wire electrode and its coupling can be removably or permanently attached to the hollow body. In certain embodiments, the metal wire electrode and its coupling are removably attached to the hollow body. That allows the proximal end of the hollow body to act as a port for introduction of fluids into the body. In such as embodiment, the metal wire electrode and its coupling is removed from the hollow body, leaving an opening through which fluids are introduced into the body. Once introduced, the metal wire electrode and its coupling are attached to the hollow body, sealing the hollow body.

In other embodiments, the attachment is a permanent attachment and one or more separate fluid ports along the body are used to introduce the fluids to the hollow body. Even if the attachment of the metal wire electrode and its coupling to the hollow body is a removable attachment, the hollow body can still include one or more separate ports along the body to introduce the fluids to the hollow body.

In exemplary embodiments, the introduction of high voltage to the liquid within the hollow body ejects the liquid from the distal tip of the hollow body in the form of a spray. An inlet of a mass spectrometer is operably located to receive the liquid ejected from the probe. That distance is typically less than 10 mm, however any distance that allows a signal from the sample to be generated within the mass spectrometer is suitable. That distance can by determined by the skilled artisan by simply adjusting the spacing between the probe and the inlet of the mass spectrometer and monitoring the read-out generated by the mass spectrometer.

In other embodiments, the outside wall of the pulled tip can be coated with metal. The high voltage can be applied through the metal coating for the spray ionization.

In certain embodiments, more than one analyte (e.g., a plurality of analytes) is extracted from the sample and onto the adsorbent material. One or more extraction solvents are then used to extract the plurality of analytes from the adsorbent material. That is, the plurality of analytes can be extracted at the same time using a single solvent or alternatively, the analytes are differentially eluted from the adsorbent material using one or more solvents, typically based on the polarity of the analyte and the polarity of the solvent.

While methods of the invention have been discussed using two fluids, sometimes two immiscible fluids, the systems and methods of the invention are not limited to the use of two fluids. Any number of fluids can be used with systems and methods of the invention, such as three fluids, four fluids, five fluids, etc. In certain embodiments, a three-fluid system is used. In certain exemplary embodiments, two miscible fluids are separated by an immiscible fluid. In this exemplary embodiment, the polarities of the Sample-Solvent Bridge-Extraction/Spray Solvent can be high-low-high or low-high-low.

In certain embodiments, systems and methods of the invention can also be used for preparing samples that will be analyzed later. The extraction solvent can be stored as the liquid sample or deposited on paper substrate or MALDI plate to prepare the dried sample spots. The internal standard can be incorporated in to the dried sample spots during the extraction process. The target analytes can be chemical modified during the extraction process.

In other embodiments, the hollow body does not require a distal tip because the extraction capillary is not used as an ionization probe. In such embodiments, the extraction is simply conducted as described above in a capillary. After the extraction is completed, the solvent containing the extracted analyte is removed from the capillary and is then analyzed using any method known in the art. For example, the solvent containing the extracted analyte may be loaded into a separate ionization probe and then analyzed by mass spectrometry. In other embodiments, the analyte is analyzed in a different manner, such as any spectroscopy technique or other assay known in the art.

Additional aspects of the invention are further described below.

Ion Generation

Any approach for generating ions known in the art may be employed. Exemplary mass spectrometry techniques that utilize ionization sources at atmospheric pressure for mass spectrometry include electrospray ionization (ESI; Fenn et al., Science, 1989, 246, 64-71 and Yamashita et al., J. Phys. Chem., 1984, 88, 4451-4459); atmospheric pressure ionization (APCI; Carroll et al., Anal. Chem. 1975, 47, 2369-2373); and atmospheric pressure matrix assisted laser desorption ionization (AP-MALDI; Laiko et al. Anal. Chem., 2000, 72, 652-657; and Tanaka et al. Rapid Commun. Mass Spectrom., 1988, 2, 151-153). The content of each of these references in incorporated by reference herein its entirety.

Exemplary mass spectrometry techniques that utilize direct ambient ionization/sampling methods including desorption electrospray ionization (DESI; Takats et al., Science, 2004, 306, 471-473 and U.S. Pat. No. 7,335,897); direct analysis in real time (DART; Cody et al., Anal. Chem., 2005, 77, 2297-2302); Atmospheric Pressure Dielectric Barrier Discharge Ionization (DBDI; Kogelschatz, Plasma Chem. and Plasma P., 2003, 23, 1-46 and PCT international publication number WO 2009/102766), ion generation using a wetted porous material (Paper Spray, U.S. Pat. No. 8,859,956), and electrospray-assisted laser desorption/ionization (ELDI; Shiea et al., Rapid Comm. Mass Spectrom., 2005, 19, 3701-3704). The content of each of these references in incorporated by reference herein its entirety.

Ion generation can be accomplished by placing the sample on a porous material and generating ions of the sample from the porous material or other type of surface, such as shown in Ouyang et al., U.S. Pat. No. 8,859,956, the content of which is incorporated by reference herein in its entirety. Alternatively, the assay can be conducted and ions generated from a non-porous material, see for example, Cooks et al., U.S. patent application publication number 20140264004, the content of which is incorporated by reference herein in its entirety). In certain embodiments, a solid needle probe or surface to which a high voltage may be applied is used for generating ions of the sample (see for example, Cooks et al., U.S. patent application publication number 20140264004, the content of which is incorporated by reference herein in its entirety).

In certain embodiments, ions of a sample are generated using nanospray ESI. Exemplary nano spray tips and methods of preparing such tips are described for example in Wilm et al. (Anal. Chem. 2004, 76, 1165-1174), the content of which is incorporated by reference herein in its entirety. NanoESI is described for example in Karas et al. (Fresenius J. Anal. Chem., 2000 366, 669-676), the content of which is incorporated by reference herein in its entirety.

Ion Analysis

Figure 11:
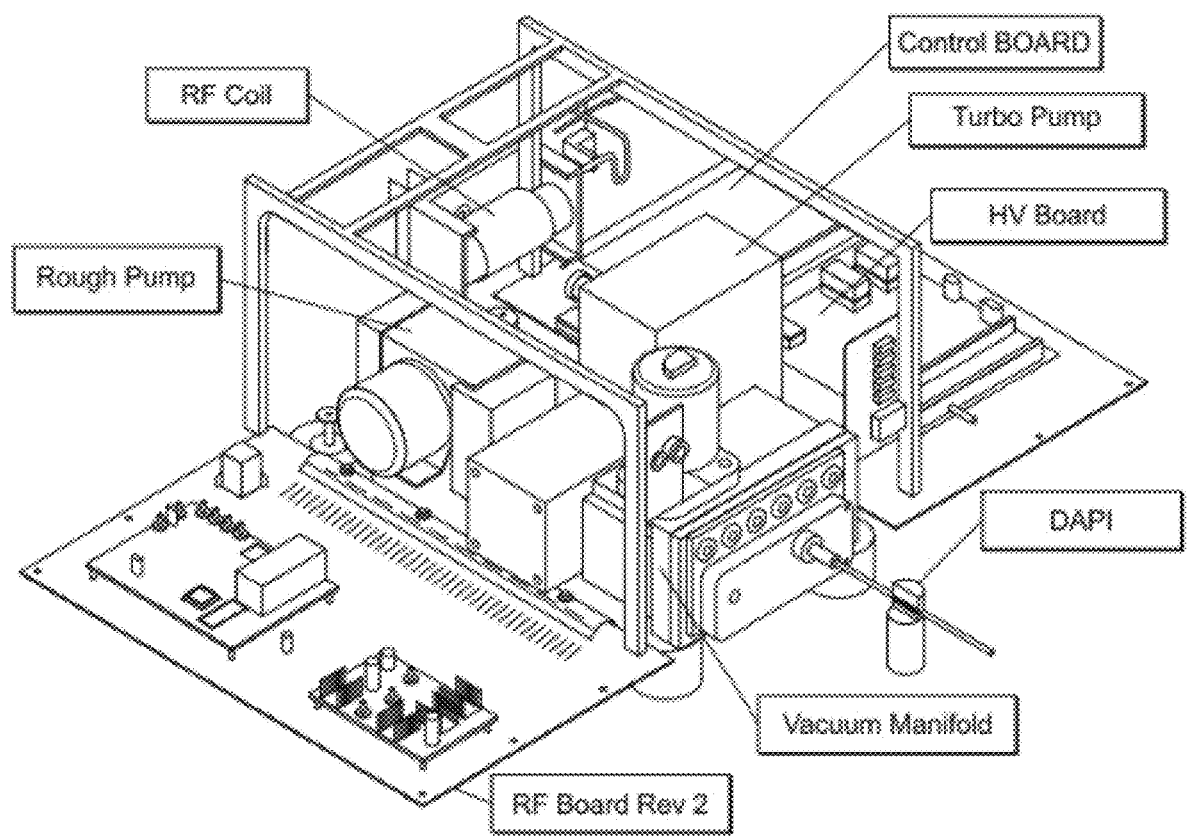
FIG. 11 is a picture illustrating various components and their arrangement in a miniature mass spectrometer.

In certain embodiments, the ions are analyzed by directing them into a mass spectrometer (bench-top or miniature mass spectrometer). FIG. 11 is a picture illustrating various components and their arrangement in a miniature mass spectrometer. The control system of the Mini 12 (Linfan Li, Tsung-Chi Chen, Yue Ren, Paul I. Hendricks, R. Graham Cooks and Zheng Ouyang "Miniature Ambient Mass Analysis System" Anal. Chem. 2014, 86 2909-2916. DOI: 10.1021/ac403766c; and Paul I. Hendricks, Jon K. Dalgleish, Jacob T. Shelley, Matthew A. Kirleis, Matthew T. McNicholas, Linfan Li, Tsung-Chi Chen, Chien-Hsun Chen, Jason S. Duncan, Frank Boudreau, Robert J. Noll, John P. Denton, Timothy A. Roach, Zheng Ouyang, and R. Graham Cooks "Autonomous in-situ analysis and real-time chemical detection using a backpack miniature mass spectrometer: concept, instrumentation development, and performance" Anal. Chem., 2014, 86, 2900-2908. DOI: 10.1021/ac403765x, the content of each of which is incorporated by reference herein in its entirety), and the vacuum system of the Mini 10 (Liang Gao, Qingyu Song, Garth E. Patterson, R. Graham Cooks and Zheng Ouyang, "Handheld Rectilinear Ion Trap Mass Spectrometer", Anal. Chem., 2006, 78, 5994-6002. DOI: 10.1021/ac061144k, the content of which is incorporated by reference herein in its entirety) may be combined to produce the miniature mass spectrometer shown in FIG. 11. It may have a size similar to that of a shoebox (H20 cm×W25 cm×D35 cm). In certain embodiments, the miniature mass spectrometer uses a dual LIT configuration, which is described for example in Owen et al. (U.S. Pat. No. 9,165,754), and Ouyang et al. (U.S. patent application Ser. No. 61/865,377), the content of each of which is incorporated by reference herein in its entirety.

The mass spectrometer (miniature or benchtop), may be equipped with a discontinuous interface. A discontinuous interface is described for example in Ouyang et al. (U.S. Pat. No. 8,304,718) and Cooks et al. (U.S. patent application publication number 2013/0280819), the content of each of which is incorporated by reference herein in its entirety.

Sample

As discussed above, the systems and methods of the invention can be used to analyze many different types of samples. A wide range of heterogeneous samples can be analyzed, such as biological samples, environmental samples (including, e.g., industrial samples and agricultural samples), and food/beverage product samples, etc.).

Exemplary environmental samples include, but are not limited to, groundwater, surface water, saturated soil water, unsaturated soil water; industrialized processes such as waste water, cooling water; chemicals used in a process, chemical reactions in an industrial processes, and other systems that would involve leachate from waste sites; waste and water injection processes; liquids in or leak detection around storage tanks; discharge water from industrial facilities, water treatment plants or facilities; drainage and leachates from agricultural lands, drainage from urban land uses such as surface, subsurface, and sewer systems; waters from waste treatment technologies; and drainage from mineral extraction or other processes that extract natural resources such as oil production and in situ energy production.

Additionally exemplary environmental samples include, but certainly are not limited to, agricultural samples such as crop samples, such as grain and forage products, such as soybeans, wheat, and corn. Often, data on the constituents of the products, such as moisture, protein, oil, starch, amino acids, extractable starch, density, test weight, digestibility, cell wall content, and any other constituents or properties that are of commercial value is desired.

Exemplary biological samples include a human tissue or bodily fluid and may be collected in any clinically acceptable manner. A tissue is a mass of connected cells and/or extracellular matrix material, e.g. skin tissue, hair, nails, nasal passage tissue, CNS tissue, neural tissue, eye tissue, liver tissue, kidney tissue, placental tissue, mammary gland tissue, placental tissue, mammary gland tissue, gastrointestinal tissue, musculoskeletal tissue, genitourinary tissue, bone marrow, and the like, derived from, for example, a human or other mammal and includes the connecting material and the liquid material in association with the cells and/or tissues. A body fluid is a liquid material derived from, for example, a human or other mammal. Such body fluids include, but are not limited to, mucous, blood, plasma, serum, serum derivatives, bile, blood, maternal blood, phlegm, saliva, sputum, sweat, amniotic fluid, menstrual fluid, mammary fluid, peritoneal fluid, urine, semen, and cerebrospinal fluid (CSF), such as lumbar or ventricular CSF. A sample may also be a fine needle aspirate or biopsied tissue. A sample also may be media containing cells or biological material. A sample may also be a blood clot, for example, a blood clot that has been obtained from whole blood after the serum has been removed.

In one embodiment, the biological sample can be a blood sample, from which plasma or serum can be extracted. The blood can be obtained by standard phlebotomy procedures and then separated. Typical separation methods for preparing a plasma sample include centrifugation of the blood sample. For example, immediately following blood draw, protease inhibitors and/or anticoagulants can be added to the blood sample. The tube is then cooled and centrifuged, and can subsequently be placed on ice. The resultant sample is separated into the following components: a clear solution of blood plasma in the upper phase; the buffy coat, which is a thin layer of leukocytes mixed with platelets; and erythrocytes (red blood cells). Typically, 8.5 mL of whole blood will yield about 2.5-3.0 mL of plasma.

Blood serum is prepared in a very similar fashion. Venous blood is collected, followed by mixing of protease inhibitors and coagulant with the blood by inversion. The blood is allowed to clot by standing tubes vertically at room temperature. The blood is then centrifuged, wherein the resultant supernatant is the designated serum. The serum sample should subsequently be placed on ice.

Prior to analyzing a sample, the sample may be purified, for example, using filtration or centrifugation. These techniques can be used, for example, to remove particulates and chemical interference. Various filtration media for removal of particles includes filer paper, such as cellulose and membrane filters, such as regenerated cellulose, cellulose acetate, nylon, PTFE, polypropylene, polyester, polyethersulfone, polycarbonate, and polyvinylpyrolidone. Various filtration media for removal of particulates and matrix interferences includes functionalized membranes, such as ion exchange membranes and affinity membranes; SPE cartridges such as silica- and polymer-based cartridges; and SPE (solid phase extraction) disks, such as PTFE- and fiberglass-based. Some of these filters can be provided in a disk format for loosely placing in filter holdings/housings, others are provided within a disposable tip that can be placed on, for example, standard blood collection tubes, and still others are provided in the form of an array with wells for receiving pipetted samples. Another type of filter includes spin filters. Spin filters consist of polypropylene centrifuge tubes with cellulose acetate filter membranes and are used in conjunction with centrifugation to remove particulates from samples, such as serum and plasma samples, typically diluted in aqueous buffers.

Filtration is affected in part, by porosity values, such that larger porosities filter out only the larger particulates and smaller porosities filtering out both smaller and larger porosities. Typical porosity values for sample filtration are the 0.20 and 0.45 µm porosities. Samples containing colloidal material or a large amount of fine particulates, considerable pressure may be required to force the liquid sample through the filter. Accordingly, for samples such as soil extracts or wastewater, a prefilter or depth filter bed (e.g. "2-in-1" filter) can be used and which is placed on top of the membrane to prevent plugging with samples containing these types of particulates.

In some cases, centrifugation without filters can be used to remove particulates, as is often done with urine samples. For example, the samples are centrifuged. The resultant supernatant is then removed and frozen.

After a sample has been obtained and purified, the sample can be analyzed. With respect to the analysis of a blood plasma sample, there are many elements present in the plasma, such as proteins (e.g., Albumin), ions and metals (e.g., iron), vitamins, hormones, and other elements (e.g., bilirubin and uric acid). Any of these elements may be detected. More particularly, systems of the invention can be used to detect molecules in a biological sample that are indicative of a disease state.

Where one or more of the target molecules in a sample are part of a cell, the aqueous medium may also comprise a lysing agent for lysing of cells. A lysing agent is a compound or mixture of compounds that disrupt the integrity of the membranes of cells thereby releasing intracellular contents of the cells. Examples of lysing agents include, but are not limited to, non-ionic detergents, anionic detergents, amphoteric detergents, low ionic strength aqueous solutions (hypotonic solutions), bacterial agents, aliphatic aldehydes, and antibodies that cause complement dependent lysis, for example. Various ancillary materials may be present in the dilution medium. All of the materials in the aqueous medium are present in a concentration or amount sufficient to achieve the desired effect or function.

In some examples, where one or more of the target molecules are part of a cell, it may be desirable to fix the cells of the sample. Fixation of the cells immobilizes the cells and preserves cell structure and maintains the cells in a condition that closely resembles the cells in an in vivo-like condition and one in which the antigens of interest are able to be recognized by a specific affinity agent. The amount of fixative employed is that which preserves the cells but does not lead to erroneous results in a subsequent assay. The amount of fixative may depend for example on one or more of the nature of the fixative and the nature of the cells. In some examples, the amount of fixative is about 0.05% to about 0.15% or about 0.05% to about 0.10%, or about 0.10% to about 0.15% by weight. Agents for carrying out fixation of the cells include, but are not limited to, cross-linking agents such as, for example, an aldehyde reagent (such as, e.g., formaldehyde, glutaraldehyde, and paraformaldehyde,); an alcohol (such as, e.g., $C_1$-$C_5$ alcohols such as methanol, ethanol and isopropanol); a ketone (such as a $C_3$-$C_5$ ketone such as acetone); for example. The designations $C_1$-$C_5$ or $C_3$-$C_5$ refer to the number of carbon atoms in the alcohol or ketone. One or more washing steps may be carried out on the fixed cells using a buffered aqueous medium.

If necessary after fixation, the cell preparation may also be subjected to permeabilization. In some instances, a fixation agent such as, an alcohol (e.g., methanol or ethanol) or a ketone (e.g., acetone), also results in permeabilization and no additional permeabilization step is necessary. Permeabilization provides access through the cell membrane to target molecules of interest. The amount of permeabilization agent employed is that which disrupts the cell membrane and permits access to the target molecules. The amount of permeabilization agent depends on one or more of the nature of the permeabilization agent and the nature and amount of the cells. In some examples, the amount of permeabilization agent is about 0.01% to about 10%, or about 0.1% to about 10%. Agents for carrying out permeabilization of the cells include, but are not limited to, an alcohol (such as, e.g., $C_1$-$C_5$ alcohols such as methanol and ethanol); a ketone (such as a $C_3$-$C_5$ ketone such as acetone); a detergent (such as, e.g., saponin, TRITON X-100 (4-(1,1,3,3-Tetramethylbutyl)phenyl-polyethylene glycol, t-Octylphenoxypolyethoxyethanol, Polyethylene glycol tert-octylphenyl ether buffer, commercially available from Sigma Aldrich), and TWEEN-20 (Polysorbate 20, commercially available from Sigma Aldrich)). One or more washing steps may be carried out on the permeabilized cells using a buffered aqueous medium.

INCORPORATION BY REFERENCE

References and citations to other documents, such as patents, patent applications, patent, publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A method for extracting an analyte from a sample, the method comprising:
    introducing a sample into a capillary;
    inserting a probe into the capillary, wherein the probe comprises an elongate body comprising an adsorbent material on at least a portion of the elongate body, the probe being configured to fit within the capillary such that the adsorbent material enters the sample;
    interacting within the capillary the sample with the adsorbent material of the probe such that at least one analyte is extracted from the sample and binds to the adsorbent material;
    interacting the adsorbent material of the probe with an extraction solvent by at least one of:
        (i) moving the probe from the sample into the extraction solvent that is already within the capillary in a manner that the adsorbent material enters the extraction solvent wherein the sample is immiscible with the extraction solvent; or
        (ii) removing the sample from the capillary after the probe has been inserted into the sample within the capillary, and introducing the extraction solvent into the capillary in a manner that the adsorbent material interacts with the extraction solvent; and
    interacting the extraction solvent with the adsorbent material in order to elute the at least one analyte from the adsorbent material.

2. The method according to claim 1, further comprising analyzing the at least one extracted analyte.

3. The method according to claim 2, wherein analyzing comprises:
    applying a voltage to the extraction solvent comprising the at least one analyte in the capillary so that the at least one analyte is expelled from the capillary, thereby generating ions of the at least one analyte; and
    analyzing the ions.

4. The method according to claim 2, wherein analyzing comprises:
    removing the solvent comprising the at least one analyte from the capillary; and
    conducting an assay that analyzes the at least one analyte.

5. The method according to claim 1, wherein the adsorbent material comprises one or more molecules that react with the at least one analyte.

6. The method according to claim 5, further comprising conducting a reaction between the one or more molecules and the at least one analyte to produce a reaction product.

7. The method according to claim 6, further comprising analyzing the reaction product.

8. The method according to claim 1, wherein the extraction solvent comprises one or more molecules that react with the at least one analyte.

9. The method according to claim 8, further comprising conducting a reaction between the one or more molecules and the at least one analyte to produce a reaction product.

10. The method according to claim 9, further comprising analyzing the reaction product.

11. The method according to claim 1, wherein the adsorbent material includes an internal standard.

12. The method according to claim 11, wherein the internal standard is eluted from the adsorbent material by the extraction solvent.

13. The method according to claim 12, further comprising analyzing the internal standard and the at least one analyte.

* * * * *